Patented June 21, 1949

2,474,175

UNITED STATES PATENT OFFICE 2,474,175

PROCESS FOR CARRYING OUT CONDENSATION REACTIONS

Charles Weizmann, London, England, assignor to Polymerisable Products Limited, London, England, a British company No Drawing. Application May 3, 1945, Serial No. 591,857. In Great Britain March 2, 1944

Section 1, Public Law 690, August 8, 1946
Patent expires March 2, 1964

12 Claims. (Cl. 260—465)

The present invention relates to an improved process for carrying out condensation reactions in organic chemistry.

The condensation reactions between compounds containing reactive methylene groups or reactive methine groups ($CH_2$ or $CH$ respectively) with compounds with which condensation can take place with elimination of water or hydrohalogenic acid, have heretofore usually been carried out with the help of metallic sodium, anhydrous sodium alcoholates (either in an excess of the corresponding alcohols or in inert solvents or without a solvent) or with the help of sodamide. The expression "reactive methylene and methine groups" includes all those in which the hydrogen atom or atoms of the said $CH$ group or $CH_2$ group are activated by the immediate vicinity of substituents containing double-bonds, such as carbonyl, or the esterified carboxyl groups, aromatic nuclei or the like. Such hydrogen atoms are generally replaceable by alkali metals or the metals of the alkaline earth series. These substances react with alkyl, alkenyl or aralkyl halogenides, splitting off alkali halides.

All the practical known methods (including all commercial processes) for such condensation reactions are based on the use of the free alkali metals, e. g. metallic sodium, either directly or indirectly, i. e., after reaction with anhydrous alcohols (in the formation of alcoholates) or with liquid ammonia (in the formation of sodamide).

I have now found that all these reactions can be carried out easily and with satisfactory yields by the use of the complex formed by combining potassium hydroxide and a substance containing two ether oxygen atoms separated by one or two carbon atoms, and in particular, a substance belonging to the class of acetals and dialkyl ethers of ethylene glycol. A preferred method for the preparation of such complex is described here, by way of example, (the "parts" are by weight):

224 parts of potassium hydroxide, e. g. granules or lumps or powder, are added to 625 parts of acetaldehyde-dibutylacetal, which mixture is gradually heated, while stirring. At about 150° C., the potassium hydroxide complex liquefies and (if allowed to settle) forms a bottom layer, consisting of a crystallisable molecular compound of the KOH with the said acetal. When the mass is cooled with thorough agitation during the cooling step, the complex solidifies to a finely divided microcrystalline powder, which is suspended in the excess of the acetal.

Lower boiling acetals also form such complexes but not quantitatively, as the liquefying step cannot be carried out under atmospheric pressure and, therefore, if working at atmospheric pressure, only the surface of the pieces of solid material is converted into the complex. It is possible to follow the above procedure with lower boiling acetals, if one works under elevated pressure; but this would represent a certain complication of the procedure, and one can, therefore, in such cases take an excess of potassium hydroxide over the theoretical amount required in the condensation reaction, and use preferably potassium hydroxide in the form of a powder.

The choice of the specific acetal to be applied in a given reaction mainly depends on the boiling points of both the starting materials and the final products; it is chosen so as to allow an easy separation of the solvent (acetal) from the end-product and from any unchanged starting material.

In the following table, a number of such acetals are given, arranged according to their boiling points:

Acetals formed from:

|  | °C. |
|---|---|
| Methyl ethyl ketone and glycol | 115 |
| Propionaldehyde and ethyl alcohol | 124 |
| Butyraldehyde and ethyl alcohol | 143 |
| Acetaldehyde and propyl alcohol | 143 |
| Butyraldehyde and isopropyl alcohol | 164 |
| 2-ethyl-hexanal and methyl alcohol | 165 |
| Acetaldehyde and isobutyl alcohol | 175 |
| Acetaldehyde and n-butyl alcohol | 186 |
| Butyraldehyde and butyl alcohol | 213 |

The condensation operation is very simple: one adds to the complex, prepared as above, the mixture of the starting materials to be condensed with each other, preferably at a temperature of 0° C., but higher temperatures are advisable in some cases. The reaction is usually lively and is accompanied by a distinct rise in temperature which is checked by external cooling. The reaction can be completed, if necessary, by heating at a suitable temperature. By subsequent addition of water the inorganic material is transferred into the aqueous phase (i. e. aqueous KCl solution or aqueous KOH solution containing KCl) and the organic layer which separates (being insoluble in the aqueous solution) is subjected to fractional distillation or any other treatment, suitable for the isolation of the desired product.

In the case of a condensation of the defined $CH_2$ or $CH$ compound with an alkyl halogenide, the aqueous phase formed when the water is added will contain potassium halide.

In preparing acetals for use according to the present invention the best catalyst for these acetalisations is a solution of gaseous hydrochloric acid in the alcohol used in the particular reaction. The following preparations are described by way of example:

(a) Acetal from methyl-ethyl ketone and glycol. To a mixture of 125 g. ethylene glycol and 1200 cc. methyl-ethyl ketone is added a solution of hydrochloric acid in glycol, containing 10 g. HCl, and with about 50 g. anhydrous manganese sulphate. One shakes at room temperature for 48 hours and neutralises the liquid with anhydrous sodium carbonate, and it is then subjected to fractional distillation. The excess of methyl-ethyl ketone is recovered and a quantitative yield of the acetal is obtained; it boils at 115° C. and has a camphor-like odour.

(b) Acetal from 2-ethyl-hexanal and methyl alcohol. 216 g. 2-ethyl-hexanal and 384 g. methanol (6 mols.) were cooled at 0° C. and a methanolic solution containing 2 g. gaseous hydrochloric acid was added. After 48 hours, sodium carbonate was added in order to neutralise the acid and the reaction product was fractionated. Apart from the unchanged starting materials, 220 g. of the desired acetal were obtained, B. P. 163–166°. The conversion is 75%; the yield 100%.

(c) Other acetals can be prepared by an adaptation of the method described under (b).

Amongst the substances containing reactive methylene or methine groups, mention may be made of:

I. β-Keto-esters which can be both mono, and dialkylated by the process of this invention. (The word "alkylated" is here and hereinafter intended to include the introduction of an aralkyl group such as benzyl.) This is not only true for ethylacetoacetate but also for cyclopentanone-2-carboxylate, and even heterocyclic ring-ketones, which are substituted in α-position by an esterified carboxyl group. Furthermore, ethyl ethoxyalyl-acetate $H_5C_2.OOC.CO.CH_2.COOC_2H_5$ can be alkylated, both with one and two mols. of an alkyl halogenide. The reaction products, however, are not stable and decompose, upon distillation, into carbon monoxide and the corresponding substituted malonates.

II. Ethylcyano-acetate which is easily alkylated as also are its substitution products, e. g. ethyl-cyclohexenyl-cyano-acetate.

III. Esters and hydrocarbons which do not contain a keto group but which have a reactive $CH_2$ group on account of the vicinity of an aromatic radicle or another unsaturated group, such as ethyl phenylacetate, fluorene, indene and 9-alkyl or 9-aryl fluorenes.

In all these cases, the success of the reaction does, obviously, not only depend on the mobility of the hydrogen atom to be replaced, but also on the reactivity of the alkyl halogenide. This is obvious, because of the fact that the reaction of the halogenide with potassium hydroxide competes with the condensation, and only if the latter is speedy enough, the results are satisfactory. It is, however, remarkable that in the "complex" the reactivity of the hydroxide appears very much depressed; as a matter of fact the hydroxide does usually even at elevated temperature and on prolonged contacts not cause an appreciable hydrolysis of the esters to be alkylated.

Amongst the alkyl halides, benzyl chloride, methallyl chloride and alkyl bromo-acetates are the most reactive, isobutyl bromide comes next and the simple alkyl halides show a much lower reactivity. The methallyl chloride here mentioned, is an unsaturated body, i. e. an alkenyl chloride, and the benzyl chloride is an aralkyl halide. But since these all react in an analogous manner, they may be considered as alkyl halides, and they are so considered in some of the text books. These may be regarded as an alkyl group in which a hydrogen is substituted by an unsaturated or aryl group.

In the following examples, some typical condensations are described, but the method is obviously not limited to these examples. The parts are by weight.

EXAMPLE 1.—ALKYLATION OF ETHYL ACETO-ACETATE

Ethyl acetoacetate reacts with the complex visibly at about 50–60° C. forming a very thick mass (enolate). The alkylation proceeds speedily at about 80° C.; in the case of methallyl chloride, however, lower temperatures are advisable for the alkylation proper. Whether the mono- or the di-alkyl derivative is formed, depends almost exclusively on the ratio of the reagents and only to a minor extent on the temperature, increase in temperature favouring di-substitution. The solvent is, of course, selected so that its boiling temperature is not too near to those of any of the starting materials or end-products.

(a) *Ethyl aceto-acetate and benzyl chloride (molar ratio 1:1)*

33 g. powdered potassium hydroxide, corresponding to 28 g. (0.5 mol.) pure KOH were converted into the complex with 300 cc. acetaldehyde diethyl acetal. A mixture of 65 g. (0.5 mol.) ethyl aceto-acetate and 63.3 g. (0.5 mol.) benzylchloride was slowly added to the fine suspension of the complex. The temperature was raised to about 80°. At this point, quick condensation set in, characterised by the appearance of potassium chloride and by a spontaneous rise of temperature to about 90°. The stirring was continued for 1 hour at 70°. The reaction mixture was then cooled and decomposed with cold water. The solvent layer was separated and repeatedly washed with water in order to remove any traces of potassium hydroxide. Fractional distillation of the reaction product gave:

B. P. 100–105°—acetaldehyde diethyl acetal.
B. P. 75–85°/18 mm.—unreacted benzyl chloride containing a small quantity of ethyl aceto-acetate.
B. P. 156–162°/13 mm.—ethyl benzyl-aceto-acetate, 67.5 g.=61.4% of theory.
B. P. 205–210°/16 mm.—ethyl dibenzyl-aceto-acetate, 10.5 g.=6.77% of theory.

All the unreacted benzylchloride was recovered and some of the ethyl aceto-acetate, part of which was probably dissolved in the alkaline aqueous layer or had suffered hydrolysis. Similar results were obtained when—instead of the low-boiling acetal—the high-boiling butyraldehyde dibutyl acetal (B. P. 98–105°/15 mm.) was employed for the formation of the complex.

It is interesting to observe that benzyl chloride is not attacked by the complex under the above conditions.

(b) *Ethyl aceto-acetate and benzyl chloride (molar ratio 1:2)*

66 g. powdered potassium hydroxide, corresponding to 56 g. (1 mol.) pure KOH, were converted into the complex with 350 cc. acetaldehyde diethyl acetal. The suspension was vigorously stirred and heated to 80°. At this point, a mixture of 65 g. (0.5 mol.) ethyl aceto-acetate and 126.5 g. (1 mol.) benzylchloride was slowly added, the temperature being carefully checked.

After the addition was finished, the mixture was stirred for further 2 hours at 80°, then cooled, decomposed with water and worked up as above. The fractional distillation gave at 100–105° the acetal, then at B. P. 75–85°/18 mm. the unreacted benzyl-chloride, containing a small amount of ethyl aceto-acetate. There was obtained further At B. P. 158–164°/16 mm.—16.5 g. ethyl benzyl-aceto-acetate, i. e. 15.0% of theory, and
At B. P. 210–213°/16 mm.—116.5 g. ethyl dibenzyl-aceto-acetate, i. e. 75.2% of theory.

The ethyl dibenzyl-acetoacetate solidified on cooling, giving crystals of M. P. 55–57°.

It is worthy of note that due to the longer heating period, the total conversion reached about 90% of theory.

(c) *Ethyl benzyl-aceto-acetate and benzyl chloride*

The complex prepared from 16.5 g. potassium hydroxide, containing 14 g. (0.25 mol.) pure KOH, and 180 cc. acetaldehyde diethyl acetal, was vigorously stirred and heated to 80°. At this point, a mixture of 55 g. (0.25 mol.) ethyl benzyl-aceto-acetate and 31.6 g. (0.25 mol.) benzyl chloride was slowly added, the temperature being carefully checked. The mixture was stirred for further 2 hours at 80°, then cooled and decomposed with water. Fractional distillation gave, besides the acetal recovered, At 75–85°/18 mm.—unreacted benzyl chloride, 6.3 g.=20.0%.
At 158–164°/16 mm.—unreacted ethyl benzyl-aceto-acetate, 8.0 g.=14.5%, and
At 210–213°/16 mm.—ethyl dibenzyl-aceto-acetate, 60 g.=77.4% of theory.

(d) *Ethyl aceto-acetate and n-butyl bromide (molar ratio 1:1)*

A number of preliminary experiments, employing the potassium hydroxide complex with acetaldehyde dibutyl acetal and with ethylene-glycol ethyl butyl ether, showed that no or only very little reaction took place by stirring the mixture of the reactants at 0° or at room temperature for several hours. Only when the temperature was raised to about 75°, condensation set in but not as smoothly as with benzyl chloride.

The complex prepared from 33 g. potassium hydroxide, corresponding to 28 g. (0.5 mol.) pure KOH, and 300 cc. acetaldehyde dipropyl acetal was vigorously stirred and heated at 75° C. A mixture of 65 g. (0.5 mol.) ethyl aceto-acetate and 68.5 g. (0.5 mol.) n-butyl bromide was slowly added. Stirring was continued at 90° (with reflux) for a further 3 hours. The mixture was then cooled and decomposed with water. Fractional distillation gave at 95–105° 40 g., i. e. 58.4% unreacted n-butyl bromide. After the recovery of the acetal used, a small quantity of unreacted ethyl aceto-acetate of B. P. 76–80°/18 mm. was obtained. Finally, at 112–115°/15 mm., ethyl n-butyl-aceto-acetate distilled over; yield, 35 g., i.e. 37.6% of theory; conversion 96%, calculated on the alkyl bromide. No higher-boiling compound was formed.

(e) *Ethyl-n-butyl-aceto-acetate and benzyl chloride*

The complex formed from 16.5 g. potassium hydroxide, containing 14 g. (0.25 mol.) pure KOH, and 180 cc. acetal, was vigorously stirred and heated to 80°. At this point, a mixture of 46.5 g. (0.25 mol.) ethyl n-butyl-aceto-acetate and 31.6 g. (0.25 mol.) benzyl chloride was added. The reaction was sluggish. The mixture was stirred and heated at 100° for further 3 hours, then cooled and decomposed with water. The fractional distillation gave:

At B. P. 100–105°—acetal.
At B. P. 75–85°/18 mm.—benzyl chloride, unreacted, 12.5 g.=39.6% of the initial amount.
At B. P. 112–120°/16 mm.—ethyl n-butyl-aceto-acetate, unreacted 14 g.=30.1% of the initial amount, and
At B. P. 178–185°/16 mm.—ethyl n-butyl-benzyl-aceto-acetate, 38 g. i.e. 55.07% of theory.

The desired reaction product is a colourless liquid, showing, on re-distillation, the B. P. 178–182°/16 mm.

When the higher boiling acetaldehyde-dipropyl-acetal was employed for the formation of the complex and the reaction temperature raised to about 110–120°, the yield reached 65%. The conversion, of course, is much higher.

(f) *Ethyl aceto-acetate and isobutyl bromide (molar ratio 1:1)*

16.5 g. potassium hydroxide, containing 14 g. (0.25 mol.) pure KOH, were converted into the complex with 300 cc. acetaldehyde dipropyl acetal. The suspension was vigorously stirred and heated to 75°. A mixture of 32.5 g. (0.25 mol.) ethyl aceto-acetate and 34.4 g. (0.5 mol.) isobutyl bromide was slowly added. Stirring was continued at 80° (with reflux) for a further 2 hours. The cooled reaction mixture was decomposed with water and worked up as usual. Fractional distillation gave at 90–93° the unreacted isobutyl bromide (15 g.=43.8% of the initial amount). After recovery of the acetal used, a small quantity of unreacted ethyl aceto-acetate of B. P. 76–80°/18 mm. distilled over. Ethyl isobutyl-aceto-acetate showed B. P. 104–107°/15 mm. Yield, 20.0 g.= 43.0% of theory. Finally, at 135–140°/15 mm., 2.5 g. (=4.13% of theory) of a thick oil were collected, presumably ethyl di-isobutyl-aceto-acetate.

(g) *Ethyl aceto-acetate and methallyl chloride (molar ratio 1:1)*

The complex formed from 13 g. potassium hydroxide (87.2% purity) and 200 cc. acetaldehyde dipropyl acetal was cooled at 0° C. and a mixture of 26 g. ethyl aceto-acetate and 18 g. methallyl chloride was added. The reaction mixture was allowed to attain room temperature and was then treated with water. Distillation gave only very small amounts of the starting materials, the solvent and a practically quantitative yield of ethyl methallyl-aceto-acetate, a hitherto unknown substance boiling under 20 mm. pressure at 114–116° C. It has a sharp unpleasant odour. Very small quantities of a higher boiling product were observed, probably identical with the substance described in the following experiment.

(h) *Ethyl aceto-acetate and methallyl chloride (molar ratio 1:2)*

To the complex from 26 g. potassium hydroxide and 400 cc. acetaldehyde dibutyl acetal, a mixture of 26 g. ethyl aceto-acetate and 36 g. methallyl chloride was added at 0° C. and, as usual, with vigorous stirring. The reaction mixture was kept for 24 hours at room temperature, and then heated for two hours at 50° C. Fractional distillation gave some starting material and the solvent which were distilled off at ordinary pressure. When the distillation was continued in the vacuum of the filter pump (20 mm.), hardly any ethyl mono-methallyl aceto-acetate was observed, but 70% of ethyl dimethallyl-aceto-acetate, B. P. 151–152° C., were obtained.

EXAMPLE 2.—ALKYLATION OF DIETHYL MALONATE

The alkylation of diethyl malonate, even with benzyl chloride, is much slower than that of ethyl aceto-acetate. The following experiment shows that during the time required for the reaction to take place to an extent of 25%, 40% of the ethyl malonate decomposed. No experiments were, therefore, carried out with still less reactive halides, such as n-butyl bromide.

33 g. powdered potassium hydroxide, corresponding to 28 g. (0.5 mol.) pure KOH, were converted into the complex with 300 cc. acetal. A mixture of 80 g. (0.5 mol.) diethyl malonate and 63.3 g. (0.5 mol.) benzyl chloride was added to the vigorously stirred suspension, and the temperature was raised to 75°. At this point, the voluminous complex began to disappear and precipitation of potassium chloride set in. The stirring was continued for 3 hours at 90° (with reflux). The precipitate contained potassium malonate, characterised by conversion into the Ca- or Ba- salts, which are almost insoluble in cold water.

The reaction mixture was cooled and decomposed with water, the solvent layer separated and dried. Fractional distillation gave:

B. P. 100–105°—acetal.
B. P. 75–80°/17 mm.—benzyl chloride, 47 g.= 74.25% of initial amount.
B. P. 88–90°/13 mm.—diethyl malonate, 28 g.= 35.0% of initial amount.
B. P. 170–175°/15 mm.—diethyl benzyl-malonate, 29.7 g.=23.76% of theory. (Conversion calculated on the benzyl chloride, quantitative.)

Similar results were obtained when—instead of the low-boiling acetal—the high-boiling butyraldehyde dibutyl acetal (B. P. 98–105°/15 mm.) was employed for the formation of the complex. The yield of the desired product reached 24%.

EXAMPLE 3.—BENZYLATION OF ETHYL ETHOXALYL-ACETATE

Ethyl ethoxalyl-acetate was prepared from diethyl oxalate and ethyl acetate by means of sodium methoxide. Yield, 65%; B. P. 131–132°/24 mm.

(a) *Ethyl ethoxalyl-acetate and benzyl chloride (molar ratio 1:1)*

16.5 g. powdered potassium hydroxide, corresponding to 14 g. (0.25 mol.) pure KOH, were converted into the complex with 170 cc. acetaldehyde diethyl acetal. A mixture of 47 g. (0.25 mol.) ethyl ethoxalyl-acetate and 31.6 g. (0.25 mol.) benzyl chloride was added at room temperature to the fine suspension, which was vigorously stirred. Since no reaction took place, the temperature was raised. At about 60° the mixture became very thick and between 70 and 75° reaction set in, characterised by the disappearance of the voluminous complex and the precipitation of KCl. The stirring was continued at 80° for 1 hour. The reaction mixture was then cooled and decomposed with ice water. The aqueous layer, reacting slightly alkaline, was at once neutralised with dilute sulphuric acid. The solvent layer was washed with water, and dried with magnesium sulphate and fractionated.

100–105°—acetal.
75–85°/18 mm.—benzyl chloride, 16 g.=50.6% of the initial amount.
131–132°/24 mm.—ethyl ethoxalyl-acetate, 2 g. (The main part of the not benzylated material had decomposed.)

The residual liquid gave with alcoholic ferric chloride solution a deep-red colour reaction, thus indicating the presence of the desired ethyl ethoxalyl-benzyl-acetate

This substance decomposed even in vacuo into diethyl benzyl-malonate and carbon monoxide. Thus, further distillation showed vivid gas development and gave at 170–180°/15 mm. (redistilled 170–175°/15 mm.) diethyl benzyl-malonate in a yield of 27.5 g.= 44.0% of the theoretical amount.

(b) *Ethyl ethoxalyl-acetate and benzyl-chloride (molar ratio 1:2)*

33 g. powdered potassium hydroxide, containing 28 g. (0.5 mol.) pure KOH, were converted into the complex with 300 cc. acetal. The suspension was vigorously stirred and heated to 70° At this point, a mixture of 47 g. (0.25 mol.) ethyl ethoxalyl-acetate and 63.3 g. (0.5 mol.) benzyl chloride was slowly added. The mixture was agitated for a further 2 hours at 80°, then cooled, decomposed with ice water and at once neutralised with dilute sulphuric acid.

Fractional distillation of the dried acetal layer gave:

100–105°—acetal.
75–85°/18 mm.—benzyl chloride, 37 g.=58.45% of the initial amount.

Upon further heating, vivid development of gas took place. When it subsided, the following further two fractions were secured:

170–180°/15 mm.—redistilled B. P. 170–175°/15 mm. diethyl benzyl-malonate, 10.5 g.=16.8% of theory.
210–215°/15 mm.—diethyl dibenzyl-malonate, 22.5 g.=26.5% of theory.

EXAMPLE 4.—ALKYLATION OF ETHYL CYCLOPENTANONE-2-CARBOXYLATE (a) *Ethyl cyclopentanone-carboxylate and benzyl chloride*

The complex prepared from 33 g. potassium hydroxide, corresponding to 28 g. (0.5 mol.) pure KOH, and 300 cc. acetaldehyde dipropyl acetal was vigorously stirred and heated at 75°. A mixture of 78 g. (0.5 mol.) ethyl cyclopentanone-2-carboxylate and 63.3 g. (0.5 mol.) benzyl chloride was slowly added. First a thick precipitate was formed (enolate) which on further heating disappeared again. Stirring was continued at 90° for a further 3 hours. The mixture was then cooled and decomposed with water and the aqueous solution at once neutralised with dilute acid.

Fractional distillation of the solvent layer gave apart from the acetal:

At 75–85°/17 mm.—benzyl chloride, 19.0 g.=30.1% of the initial amount.
At 123–125°/19 mm.—ethyl cyclopentanone-carboxylate, 22.0 g.=28.2% of the initial amount.
At 186–192°/14 mm.—ethyl 2-benzyl-cyclopentanone-2-carboxylate, 80 g.=65.04% of theory.

The desired reaction product is a colourless liquid no longer giving the blue colour reaction with FeCl₃, characteristic of the starting ester. Similar results were obtained when the lower-boiling acetaldehyde diethyl acetal was employed for the formation of the complex.

The conversion is almost quantitative, and no decomposition of the keto-ester takes place analogous to that of diethyl malonate.

(b) *Ethyl cyclopentanone-carboxylate and isobutyl bromide*

The complex formed from 16.5 g. potassium hydroxide, corresponding to 14 g. (0.25 mol.) pure KOH, and 180 cc. acetaldehyde dipropyl acetal was vigorously stirred and heated to 75°. A mixture of 39 g. (0.25 mol.) ethyl cyclopentanone-carboxylate and 34.4 g. (0.25 mol.) isobutyl bromide was slowly added. Stirring was continued at 90° (with reflux) for a further 6 hours. The mixture was then cooled and decomposed with water and the aqueous solution neutralised with dilute acid.

Fractional distillation of the solvent layer gave:

At 90–93°—isobutyl bromide, 21 g.=61.2% of the initial amount.
At 140–145°—acetaldehyde dipropyl acetal.
At 123–125°/19 mm.—ethyl cyclopentanone-carboxylate, 18 g.=46.2% of the initial amount.
At 138–142°/15 mm.—ethyl 2-isobutyl-cyclopentanone-2-carboxylate, 18 g.=34% of theory.

This is a colourless liquid, giving no colour reaction with FeCl₃. Although the conversion was very good, the yield was much lower than in the reaction with benzyl chloride. About 15% of the initial keto-ester decomposed, due to the prolonged heating.

(c) *Ethyl cyclopentanone-carboxylate and ethyl bromo-acetate*

The complex prepared from 16.5 g. potassium hydroxide, corresponding to 14 g. (0.25 mol.) pure KOH, and 180 cc. acetaldehyde dipropyl acetal was vigorously stirred and heated to 70°. A mixture of 39 g. (0.25 mol.) ethyl cyclopentanone-carboxylate and 41.75 g. (0.25 mol.) ethyl bromo-acetate was slowly added. A thick precipitate was formed which on further heating disappeared again and was replaced by potassium bromide. Stirring was continued at 90° for a further 2 hours. The mixture was then cooled and decomposed with ice water. The aqueous solution was neutral.

Fractional distillation of the solvent layer, after drying, gave:

At 140–145°—acetaldehyde dipropyl acetal.
At 123–125°/19 mm.—ethyl cyclopentanone-carboxylate, 8 g.=20.5% of the initial amount.
At 160–175°/16 mm.—diethyl cyclopentanone-2-carboxylate-2-acetate 37.5 g.=62% of theory (conversion 82%).

This substance is a colourless oil, showing on re-distillation B. P. 163–167°/15 mm.

EXAMPLE 5.—BENZYLATION OF ETHYL PHENYL-ACETATE 33. g. potassium hydroxide, corresponding to 28 g. (0.5 mol.) pure KOH, were converted into the complex with 300 cc. acetaldehyde dipropyl acetal. A mixture of 32 g. (0.5 mol.) ethyl phenyl-acetate (B. P. 122–125°/18 mm.) and 63.3 g. (0.5 mol.) benzyl chloride was added at room temperature to the fine suspension which was vigorously stirred. Since no reaction appeared to take place, the temperature was raised. At about 50° the mixture became very thick and at about 70°, the precipitation of potassium chloride started. The agitation was continued at 90–95° for 2 hours. The reaction mixture was then cooled, decomposed with ice water and immediately acidified with dilute sulphuric acid.

Fractional distillation of the dried acetal layer gave:

B. P. 53–55°/17 mm.—acetaldehyde dipropyl acetal.
B. P. 75–80°/18 mm.—benzyl chloride, 40.0 g.=63.2% of the initial amount.
B. P. 120–125°/18 mm.—ethyl phenylacetate, 20.5 g.=25.0% of the initial amount.
B. P. 160–165°/18 mm.—phenyl-acetic acid, 28.0 g.=41.2%, calculated on the initial amount, crystallising and melting at 75–76°.
B. P. 210–215°/18 mm.—ethyl phenyl-benzyl-acetate, 38.5 g.=30.3% of the theory.

This substance, a colourless oil, showed on re-distillation B. P. 212–214°/18 mm.

The yield in the benzylation of ethyl phenyl-acetate is 30%, the conversion 55%, calculated on the ester. The balance of the ester had been saponified, while all the benzyl chloride, corresponding to the recovered ester and to the phenyl-acetic acid formed, could be recovered.

The relative ease with which the benzylation of ethyl phenyl-acetate takes place, is the more remarkable as the ester cannot (according to the methods of the prior art) normally be alkylated and as even the more reactive benzyl cyanide has heretofore been benzylated only the powdered sodium hydroxide in sealed tubes at elevated temperature.

EXAMPLE 6.—BENZYLATION OF BUTYL ISOBUTYRATE

To the complex, prepared from 150 cc. acetaldehyde diethyl acetal and 16.5 g. potassium hydroxide (14.0 g. KOH; 0.25 mol.), a mixture of 36 g. butyl isobutyrate and 31.6 g. benzyl chloride was added at 40° C. When the temperature was raised to 55°, the mass became thick, and at 80° C., reaction occurred, characterised by the precipitation of potassium chloride. The reaction was completed by heating at 90° C. for 2 hours, and the product worked up as usual. Fractional distillation gave:

100–105°—acetaldehyde diethyl acetal.
150–165°—mixture of butyl isobutyrate and isobutyric acid.
75–80°/16 mm.—benzyl chloride, 20.0 g.=63.2% of the initial amount.
156–160°/18 mm.—butyl α-benzyl-isobutyrate (butyl 1-phenyl-2-methyl-propane-2-carboxylate) 13.5 g.=23.0% of the theory.

The fraction boiling at 150–165° could be separated by treatment with sodium bicarbonate solution, into butyl isobutyrate, 10.5 g.=29.2% of the initial amount, and isobutyric acid, 10.0 g. corresponding to 45.4% of the ester employed. It appears, therefore, that under the conditions under which benzylation occurs to an extent of 23%, almost half of the ester employed is hydrolysed.

EXAMPLE 7.—ALKYLATION OF ALKYL CYANO-ACETATES

The usual alkylation of ethyl cyano-acetate leads to some mono- and mainly dialkylation products; the over-all yields are generally low. The mono-substituted esters are much more easily hydrolysed by alkali than the di-substituted products.

(a) Ethyl cyano-acetate and benzyl chloride (molar ratio 1:1)

33 g. powdered potassium hydroxide, containing 28 g. (0.5 mol.) pure KOH, were converted into the complex with 300 cc. acetaldehyde dipropyl acetal (B. P. 53°/17 mm.). A mixture of 56.5 g. (0.5 mol.) ethyl cyano-acetate (B. P. 94°/13 mm.) and 63.3 g. (0.5 mol.) benzyl chloride was slowly added to the fine suspension which was vigorously stirred. An exothermic reaction set in, raising the temperature to 45°. The agitation was continued at 95° for 2 hours.

The reaction mixture was cooled, decomposed with ice water and at once neutralised with dilute sulphuric acid. Fractional distillation of the dried acetal layer gave:

52–55°/17 mm.—acetaldehyde dipropyl acetal.
75–80°/18 mm.—benzyl chloride, 25 g.=39.5% of the initial amount.
100–102°/18 mm.—ethyl cyano-acetate, 19.5 g.=34.5% of the initial amount.
160–186°/17 mm.—(redistilled 165–172°/15 mm.) ethyl benzyl-cyano-acetate, colourless oily liquid, 31.0 g.=30.5% of theory.
215–230°/17 mm.—(redistilled 225–227°/15 mm.) ethyl dibenzyl-cyano-acetate, a yellowish, thick syrup which upon standing, formed crystals of M. P. 33°, 10.5 g.=14.3% of theory.

The benzylation proceeded with a total yield of 44.8% to 30.5% in the direction of the mono- and to 14.3% of the di-benzyl derivative. With the complex, mono-benzylation appears thus feasible.

(b) Ethyl cyano-acetate and benzyl chloride (molar ratio 1:2)

33 g. potassium hydroxide, corresponding to 28 g. (0.5 mol.) pure KOH, were converted into the complex with 300 cc. acetaldehyde dipropyl acetal. A mixture of 28.3 g. (0.25 mol.) ethyl cyano-acetate and 63.3 g. (0.5 mol.) benzyl chloride was slowly added to the fine, well-stirred suspension. The strongly exothermic reaction was checked by cooling, the temperature being kept between 35 and 40°. The mixture was then agitated for 1 hour at 80°, cooled and decomposed with ice water and at once neutralised with dilute sulphuric acid. The solvent layer was washed with water and dried with magnesium sulphate. Fractional distillation gave, besides the acetaldehyde dipropyl acetal, 29.5 g. benzyl chloride, i. e. 46.6% of the initial amount, and 10.0 g. ethyl cyano-acetate, i. e. 35.4% of the initial amount. Furthermore, I obtained At 165–172°/15 mm.—ethyl benzyl-cyano-acetate, 7.5 g.=14.8% of theory, and
At 225–227°/15 mm.—ethyl dibenzyl-cyano-acetate, 18.5 g.=25.3% of theory.

The total benzylation amounted, therefore, to 40.1%.

(c) Ethyl cyclohexenyl-cyano-acetate and benzyl chloride

Ethyl cyclohexenyl-cyano-acetate was prepared according to the method of Harding, Haworth and Perkins; 22 cc. cyclohexanone, 22 cc. ethyl cyano-acetate and 10 drops of piperidine were kept with 25 g. anhydrous magnesium sulphate at room temperature for 24 hours, at 100° C. for 2 hours and then treated with dilute sulphuric acid and ether. B. P. 188°/35 mm.; yield, 25 g.

16.5 g. potassium hydroxide containing 14 g. (0.25 mol.) pure KOH, were converted into the complex with 180 cc. acetaldehyde dipropyl acetal. A mixture of 48.3 g. (0.25 mol.) ethyl cyclohexenyl-cyano-acetate and 31.6 g. (0.25 mol.) benzyl chloride was slowly added to the fine, well-stirred suspension. The very strongly exothermic reaction was checked by cooling, the temperature being kept at about 35°. The mixture was finally agitated for 1 hour at 70°, then cooled and decomposed with ice water and dilute $H_2SO_4$. The solvent layer was washed with water and dried with magnesium sulphate. Fractional distillation gave the following results:

53–55°/17 mm.—acetaldehyde dipropyl acetal.
75–80°/18 mm.—benzyl chloride, 14.0 g.=14.3% of the initial amount.
168–170°/20 mm.—ethyl cyclobenzyl-cyano-acetate, 11.5 g.=23.84% of the initial amount.
220–230°/17 mm.—(redistilled B. P. 223–225°/15 mm.) ethyl cyclohexenyl-benzyl-cyano-acetate, a slightly yellow, thick oil, 38.0 g.=53.7% theory.

EXAMPLE 8.—BENZYLATION OF INDENE 26.5 g. powdered potassium hydroxide, containing 22.4 g. (0.4 mol.) pure KOH, were converted into the complex with 150 cc. acetaldehyde dipropyl acetal. A mixture of 23.2 g. (0.2 mol.) freshly distilled indene and 50.6 g. (0.4 mol.) benzyl chloride was added to the well-stirred suspension at room temperature. The agitation was continued at 85° for 2 hours. The reaction mixture was decomposed with ice water and dilute sulphuric acid. Fractional distillation gave:

At 53–55°/17 mm.—acetaldehyde-dipropyl-acetal.
75–80°/17 mm.—benzyl chloride, containing a small amount of indene.
180–182°/12 mm.—1-benzyl-indene, 24.6 g.=59.7% of the theoretical amount.
205–212°/12 mm.—1.3-dibenzyl-indene, viscous, deep-yellow oil, 8.5 g.=14.4% of the theoretical amount.

The 1-benzyl-indene, upon redistillation B. P. 180–182°/12 mm., was a golden yellow oil.
Found: C, 92.8; H, 7.1; mol. wt. 218.
Calc. for $C_{16}H_{14}$: C, 93.2; H, 6.8; mol. wt. 206.

Although 2 mol. benzyl chloride were used for 1 mol. indene the main product of the reaction was the mono-benzylated compound.

The novel complexes of potassium hydroxide and acetals or dialkyl ethers of ethylene glycol, as well as the mixtures of such complexes with the excess of said acetals or such dialkyl ethers, as described herein are not claimed herein but are claimed in my copending applications Ser. No. 493,301, filed July 2, 1943, now abandoned, and 583,177 filed March 16, 1945; this latter has now matured into U. S. Patent No. 2,435,524 on February 3, 1948.

What I claim and desire to secure by Letters Patent is:

1. A process for carrying out a condensation reaction between a substance containing a reactive group selected from the class consisting of methylene ($CH_2$) and methine (CH) on the one hand, said reactive group being in the immediate vicinity, in the molecule, of a carbon-containing group containing an unsaturated bond, and a substance which is a member of the group consisting of alkyl halides, alkenyl halides and aralkyl halides on the other hand, which process includes the feature that the reagent used for promoting the condensation is the solid very finely divided complex obtained by the interaction of potassium hydroxide and an organic substance containing two ether forming oxygen atoms, which two oxygen atoms are separated from each other by at least one and not more than two carbon atoms, such complex being suspended in an excess of said organic substance.

2. A process according to claim 1 in which the complex used is one obtained from potassium hydroxide and a substance which is a member of the group consisting of acetals and dialkyl ethers of ethylene glycol.

3. A process according to claim 1 in which the substance containing the said reactive group is a β-keto ester.

4. A process according to claim 1 in which the substance containing the reactive group is a malonic ester.

5. A process according to claim 1 in which the substance containing the reactive group is a cyano-acetic ester.

6. A process as covered in claim 1, in which the said complex body is obtained by the interaction of potassium hydroxide and an organic substance having a boiling point not substantially below 115° C. and containing two oxygen atoms linked in ether form, which two oxygen atoms are separated by at least one and not over two carbon atoms.

7. A process as described which comprises contacting a mixture of an alkyl acetoacetate and a mono-halogen derivative of a hydrocarbon with a suspension of a complex of potassium hydroxide with an acetal the boiling point of which acetal is at least 115° C., said complex being suspended in an excess of said acetal, and maintaining the reaction mixture under agitation for some hours, adding water to accomplish hydrolysis, separating the resulting mixture into an aqueous layer comprising aqueous solution containing a potassium compound and an organic layer containing the condensation product.

8. A process as described which comprises mixing an alkyl acetoacetate and methallyl chloride with a suspension of a solid complex of KOH with an acetal the boiling point of which is not substantially below 115° C., in an excess of said acetal, while refrigerated, thereafter adding water and allowing to settle into two layers, namely, an organic layer and an aqueous solution containing a potassium compound, fractionally distilling the organic layer to obtain an alkyl methallyl acetoacetate, the molar ratio of the acetoacetate to methallyl chloride being not above 1:1 and not below 1:2.

9. A process as claimed in claim 7 in which the molar ratio of the acetoacetate to halogen derivative is not above 1:1 and not below 1:2.

10. A process which comprises mixing with a suspension of a solid complex of KOH and an active solvent selected from the group consisting of acetals and dialkyl ethers of ethylene glycol in an excess of such active solvent, a dialkyl malonate and a monohalogen derivative of a hydrocarbon, heating such mixture to about 90° C. for some hours, cooling the reaction mixture, adding water, separating into an aqueous layer and an organic layer, and fractionally distilling the organic layer.

11. A process as claimed in claim 10, in which diethyl malonate and benzyl chloride are used in substantially equimolecular amounts.

12. A process which comprises mixing with a suspension of a solid complex of KOH and an active solvent selected from the group consisting of acetals and dialkyl ethers of ethylene glycol in an excess of such active solvent, an alkyl cyanoacetate and benzyl chloride, thereafter heating the reaction mixture to 70–80° C. for sufficiently completing the reaction, hydrolyzing the reaction product, separating the aqueous layer produced by settling, and fractionally distilling the organic layer, the molar ratio of the cyanoacetate to benzyl chloride being not above 1:1 and not below 1:2.

CHARLES WEIZMANN.

REFERENCES CITED

The following references are of record in the file of this patent:

UNITED STATES PATENTS

| Number | Name | Date |
|---|---|---|
| 2,093,519 | Hamann | Sept. 21, 1937 |
| 2,119,526 | Cope et al. | June 7, 1938 |
| 2,150,154 | Cope | Mar. 14, 1939 |
| 2,161,191 | Perkins | June 6, 1939 |
| 2,166,487 | Felix et al. | July 18, 1939 |
| 2,171,869 | Scott et al. | Sept. 5, 1939 |
| 2,265,949 | Toder et al. | Dec. 9, 1941 |
| 2,345,170 | Zeltner et al. | Mar. 28, 1944 |
| 2,374,327 | Bruson | Apr. 24, 1945 |
| 2,377,040 | Rieveschl et al. | May 29, 1945 |

OTHER REFERENCES

Ser. No. 326,804, Zeltner et al. (A. P. C.) pub. Apr. 20, 1943.

Michael, Berichte (Deutsch. Chem. Gesell.), vol. 38, pp. 2087–2096 (1905).

Michael, Beilstein (4th ed., 1920), vol. II, page 575.

Michael, Beilstein (4th ed., 1921), vol. 3, page 636.

Robinson et al., Beilstein (4th ed., 1942), vol. II, 2nd suppl., p. 532.

Witzemann et al., "Organic Synthesis," Col. vol. II, pp. 17–18.